United States Patent Office 2,824,110
Patented Feb. 18, 1958

2,824,110

5-HYDROXY PYRROLONE-2

Edward G. Howard, Jr., Wilmington, Del., assignor to E. I. du Pont de Nemours and Company, Wilmington, Del., a corporation of Delaware No Drawing. Application June 16, 1953
Serial No. 362,149

7 Claims. (Cl. 260—326.3)

This invention relates to a new class of heterocyclic compounds and to their preparation. More specifically, it relates to a new class of functionally substituted pyrrolones and to their preparation.

Certain pyrrolines, pyrrolenines, and pyrrolidines and their functionally substituted derivatives are known to the art and their chemistry has proven of interest, particularly those derivatives carrying a plurality of functional substituents. However, most of these interesting compounds, e. g., the triketopyrrolidines, are rather sensitive to aqueous systems under both acidic and basic conditions and the nitrogen heterocycle in their molecular structure is easily broken under such conditions. Accordingly, their utility is somewhat limited.

Recently there has been discovered, see the copending application of Howard, Ser. No. 315,203, filed October 16, 1952, a new class of functionally substituted pyrrolidine derivatives which have in each of the 2-, 3-, and 5-positions oxygen or sulfur substituents and in the 4-position a negative, i. e., electron attractive, functional group containing a multiple linkage therein, e. g., a negative functional group which upon hydrolysis is converted to a carboxylic acid group. These new pyrrolidine derivatives carrying functional substituents on all four carbons of the heterocycle are stable to aqueous acid and are thus much more useful than the previously known functionally substituted pyrrolidines. However, these compounds, while being still more valuable in forming extremely stable salts and complexes with metallic ions, are for this very reason more difficult to prepare and purify in free, i. e., non-salt, form. In some instances, such as in pesticidal and fungicidal applications, it is at times desirable to apply such compounds in organic solvents for which use the free form of the compound is preferred.

Another new class of functionally substituted pyrrolidine compounds has also recently been discovered. See, for instance, the copending application of Howard, Ser. No. 341,333, filed March 9, 1953. This new class of compounds constitutes the 2,3,5-trichalcogenpyrrolidines carrying in the 4-position the cation of an onium or inium compound and are more properly described as 4 - onium - 2,3,5 - trichalcogenpyrrolidylides. The compounds of this new class, like the previously described 4-negatively substituted 2,3,5-trichalcogenpyrrolidines, are crystalline solids of color ranging from yellow to orange and are normally prepared under anhydrous conditions. Such preparative procedures are not desirable.

This invention has as an object the preparation of essentially colorless materials exhibiting fluorescent and luminescent behavior, particularly in the important blue and blue-white ranges, under excitation by ultraviolet or cathode rays and which also are readily preparable by single step reactions carried out in aqueous systems. Other objects will appear hereinafter.

These objects are accomplished by the present invention of pyrrolines having in the 2-position an oxo-substituent, in the 5-position a hydroxyl radical, in the 3-position a strong electron attractive group, having a double bond between the three and four carbons of the pyrroline ring and having the remaining valence of the nitrogen satisfied by hydrogen or a monovalent hydrocarbon radical of no more than 10 carbons and having the remaining valences of the carbons in the 4- and 5-position satisfied by monovalent hydrocarbon radicals of no more than 10 carbons. The new pyrrolones of the present invention have the general formula

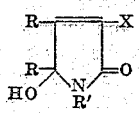

wherein R' is hydrogen or a monovalent hydrocarbon radical of not more than 10 carbons and the Rs are monovalent hydrocarbon radicals of not more than 10 carbons each which may be joined together to form a divalent radical, and X is a negative, i. e., strong electron attractive, aminohydrogen-free group which exerts when attached to a benzene nucleus a positive electrostatic polarizing effect on the adjacent carbon to carbon double bond of said benzene nucleus at least $0.84 \times 10^{-4}$ dynes, i. e., is strongly meta-directing (greater than 50%)—see Price, Chem. Rev. 29, 58 (1941) and pages 13–29, "Reactions at Carbon-Carbon Double Bonds," Price, Interscience, 1946. The most preferred pyrrolones of this invention are those wherein this strong electron attractive group in position 3 is a negative functional group containing a multiple atomic linkage therein, especially the carboxyl group and groups hydrolyzable thereto, e. g., the cyano, carboxy ester, carbamyl, carboxamido, and the like.

Because of the conjugation of multiple linkages existing in the molecular structure of these new compounds as well as the known propensity for carbonyl groups, particularly those in a ring, to react as if they were in the $$\overset{+}{\text{C}}-\overset{-}{\text{O}} \text{ form}$$

the isomeric polar structures contribute significantly to the resonance stabilization of the compounds. These various equilibrium contributing structures are illustrated by the following representative forms.

In the particular case where there is no substituent on position 1, i. e., R' is hydrogen, these compounds can also exist in and react in tautomeric forms, e. g., the 3 - negatively substituted 2,5 - dihydroxy - 1,3(5H)-pyrrolenine type structure:

However, in referring to these compounds, following conventional practice, no attempt is made to designate the various contributing resonance structures; they will simply be referred to generically as 3-substituted-5-hydroxy-2(5H)-pyrrolones.

The following examples in which parts are by weight are illustrative of the invention.

EXAMPLE I

To a mixture of 13.1 parts of ethyl malonamate ($\alpha$-ethoxycarbonylacetamide) and 8.6 parts of diacetyl (an equimolar proportion based on the malonamate) in 25 parts of water was added sufficient 10% sodium hydroxide solution to bring the pH to 8–9. The temperature of the reaction mixture rose from 30 to 47° C., and the mixture was allowed to stand at room temperature for one week. The solid product thus formed was removed by filtration and washed thoroughly with diethyl ether. After drying, there was obtained 9.5 parts (44% of theory) of crude 3-ethoxycarbonyl-5-hydroxy-4,5-dimethyl-2(5H)-pyrrolone. Upon recrystallization from water using decolorizing charcoal, the pure 3-ethoxycarbonyl-5-hydroxy-4,5-dimethyl-2(5H)-pyrrolone was obtained as white needle crystals melting at 168–172° C. with decomposition beginning at 160° C.

*Analysis.*—Calculated for $C_9H_{13}NO_4$: C, 54.26%; H, 6.58%; N, 7.03%; molecular weight 199. Found: C, 54.21%, 54.20%; H, 6.64%, 6.56%; N, 7.06%, 7.06%; molecular weight 195.

Catalytic hydrogenation at room temperature of the above product in about 50% methanol solution using 5% palladium on charcoal catalyst resulted in the formation of 3-ethoxycarbonyl-5-hydroxy-4,5-dimethyl-2-pyrrolidone.

*Analysis.*—Calculated for $C_9H_{15}NO_4$: N, 6.98%. Found: N, 6.99%, 6.99%.

EXAMPLE II

To a mixture of 10.1 parts of dry $\alpha$-acetylacetamide (prepared in accordance with the directions given in U. S. Patent 2,615,917) and 8.6 g. (an equimolar proportion based on the acetoacetamide) of diacetyl in 10 parts of water was added three drops of aqueous 10% sodium hydroxide solution, thereby bringing the pH of the mixture to 8–9. The temperature of the mixture rose over a period of five minutes from 15° C. to 45° C. After standing for an additional hour, the reaction mixture was cooled in an ice-water bath and the resultant crystalline product removed by filtration and dried. There was thus obtained 11 parts (65% of theory) of crude 3-acetyl-5-hydroxy-4,5-dimethyl-2(5H)-pyrrolone which exhibits a positive ketone test with an acid solution of 2,4-dinitrophenylhydrazine. Upon recrystallization from nitromethane, the purified 3-acetyl-5-hydroxy-4,5-dimethyl-2(5H)-pyrrolone was obtained as white needle crystals melting at 153–163° C. with extensive decomposition.

*Analysis.*—Calculated for $C_8H_{11}NO_3$: C, 56.79%; H, 6.56%; N, 8.28%. Found: C, 56.87%, 56.74%; H, 6.62%, 6.68%; N, 8.44%, 8.28%.

EXAMPLE III

To a mixture of 16.8 parts of cyanoacetamide and 17.2 parts (an equimolar proportion based on the cyanoacetamide) of diacetyl in 25 parts of water was added six drops of aqueous 10% sodium hydroxide solution bringing the pH to about 8–9. At this point reaction occurred and the temperature was maintained at 50° C. or below by intermittent cooling of the reaction mixture with an ice-water bath over a period of ten minutes. The reaction mixture was then cooled in an ice-water bath and allowed to stand overnight. The resultant solid was removed by filtration and dried. There was thus obtained 12 parts (39.5% of theory) of 3-cyano-5-hydroxy-4,5-dimethyl-2(5H)-pyrrolone. This gives a deep purple color in aqueous base.

Another similar reaction using slightly larger portions of the reactants and working up the filtrate from the reaction mixture led to the production of this material in 61% of the theoretical yield. Upon recrystallization from nitromethane using decolorizing charcoal, the pure 3-cyano-5-hydroxy-4,5-dimethyl-2(5H)-pyrrolone was obtained as white needle crystals melting at 145–147° C. These are soluble at slightly elevated (warm) temperatures in ethanol and other alcohols, in acetone and other ketones, and in water.

*Analysis.*—Calculated for $C_7H_8N_2O_2$: C, 55.27%; H, 5.30%; N, 18.42%; mol. wt. 152; $H_2$ absorption, 0.0132 g./g. Found: C, 55.31%, 55.27%; H, 5.43%, 5.27%; N, 18.20%, 18.33%; mol. wt. 148, $H_2$ absorption, 0.0142 g./g.

The "hydrogen absorption" was determined from a catalytic hydrogenation at room temperature of the above pyrrolone in about 50% methanol solution using 5% palladium on charcoal catalyst. There was thus obtained, after recrystallization from ethanol, pure 3-cyano-5-hydroxy-4,5-dimethyl-2-pyrrolidone as white needle crystals melting at 139.5–141.5° C.

*Analysis.*—Calculated for $C_7H_{10}N_2O_2$: C, 54.53%; H, 6.54%. Found: C, 54.72%, 54.61%; H, 6.54%, 6.64%.

A mixed melting point of the above pyrrolone and pyrrolidone products was 126–134° C.; whereas, the pure compounds melted, respectively, at 145–147° C. and 139.5–141.5° C. Furthermore, the pyrrolidone product exhibited characteristic infrared absorption ranges for the O—H, N—H, and CN groups but none for C=C; whereas, the pyrrolone product exhibited characteristic infrared absorption ranges for the first three of these groups and addition for the grouping C=C—CN.

When a solution of 3.06 parts of 3-cyano-5-hydroxy-4,5-dimethyl-2(5H)-pyrrolone in about 28 parts of acetic anhydride was cooled to 5° C. and the solution then stirred with a glass stirring rod having a trace of concentrated sulfuric acid on its tip, the temperature of the solution rose rapidly to 12° C. and a pale pink solid precipitated out of solution. After filtration and drying, there was thus obtained 1.6 parts of this new product. Addition of diethyl ether to the filtrate resulted in the precipitation of an additional 1.2 parts of the same product. Upon recrystallization by dissolution in dimethylformamide and precipitation with benzene, the purified product was obtained as a pale pink amorphous powder, exhibiting no specific melting point and gradually decomposing on heating over 180° C.

*Analysis.*—Calculated for $C_7H_8N_2O_2$: C, 55.27%; H, 5.30%; N, 18.42%. Found: C, 56.79%, 56.54%; H, 5.89%, 5.78%; N, 18.41%, 18.39%.

Essentially the same results were obtained when anhydrous diethyl ether containing anhydrous hydrogen chloride gas was used as the reaction medium.

3-cyano-5-hydroxy-4,5-dimethyl-2(5H)-pyrrolone undergoes no apparent reaction or change of properties when boiled in glacial acetic acid. The starting material, i. e., the 3-cyano-5-hydroxy-4,5-dimethyl-2(5H)-pyrrolone is a white needle crystalline shaped material, soluble in such warm solvents as: water; alcohols, e. g., ethanol; and ketones, e. g., acetone. On the other hand, the new product obtained, as described above, by treatment with a trace of a strong acid, is a pale pink amorphous powder insoluble in any of these solvent classes, even at the boil.

EXAMPLE IV

To a mixture of 10.2 parts of malonamide ($\alpha$-carbamylacetamide) and 0.5 part of aqueous 10% sodium hydroxide in 50 parts of water was added slowly with stirring 8.6 parts (an equimolar proportion based on the malonamide) of diacetyl over a period of ten minutes. The pH of the reaction mixture was 8–9 and the temperature of the mixture rose from 24° to 42° C. during the addition. The reaction mixture was then allowed to stand at room temperature for three days and the solid product removed by filtration and dried. There was thus obtained 8.7 parts (51% of theory) of crude 3-carbamyl- 5-hydroxy-4,5-dimethyl-2(5H)-pyrrolone. Upon recrystallization from water, the pure 3-carbamyl-5-hydroxy-4,5-dimethyl-2(5H)-pyrrolone was obtained as white needle crystals melting at 192° C. with decomposition beginning at 185–190° C.

*Analysis.*—Calculated for $C_7H_{10}N_2O_3$: C, 49.39%; H, 5.92%; N, 16.46%. Found: C, 49.21%; H, 5.93%; N, 16.26%.

EXAMPLE V

To a mixture of 4.2 parts of cyanoacetamide and 10.5 parts (an equimolar proportion based on the cyanoacetamide) of benzil (dibenzoyl) in about 40 parts of absolute ethanol was added 0.5 part of aqueous 10% sodium hydroxide solution. The solid reactants went into solution and the temperature of the reaction mixture rose from 31° to 37° C. The reaction mixture was then allowed to stand overnight and finally neutralized by the addition of dilute aqueous hydrochloric acid. Excess water was then added until the mixture became turbid and after cooling in an ice-water bath, the solid product formed was removed by filtration. After drying, there was obtained 11 parts (80% of theory) of crude 3-cyano-5-hydroxy-4,5-diphenyl-2(5H)-pyrrolone.

Upon recrystallization from benzene, pure 3-cyano-5-hydroxy-4,5-diphenyl-2(5H)-pyrrolone was obtained as white needle crystals melting at 181–183° C. The product exhibits a blue cathodoluminescence and blue and blue-white fluorescence of medium and strong intensities upon exposure to ultraviolet light of, respectively, 2537 and 3650 A. thus fitting the compound for use as a "phosphor" in television screens, radar screens, fluorescent bulbs, and the like.

*Analysis.*—Calculated for $C_{17}H_{12}N_2O_2$: N, 10.14%. Found: N, 10.10%, 10.34%.

EXAMPLE VI

To a solution of one part of sodium hydroxide in about 140 parts of absolute ethanol was added in single portions, at once, 10.2 parts of malonamide (α-carbamylacetamide) and 21 parts (an equimolar proportion based on the malonamide) of benzil. Reaction occurred at once as evidenced by a rise in the temperature of the reaction mixture and the gradual dissolution of the malonamide. After a reaction time of ten minutes, the mixture was filtered and the filtrate allowed to stand for one day at room temperature. The resultant solid was removed by filtration and after drying there was thus obtained 24 parts (82% of theory) of crude 3-carbamyl-5-hydroxy-4,5-diphenyl-2(5H)-pyrrolone. After recrystallization from absolute ethanol, the pure 3-carbamyl-5-hydroxy-4,5-diphenyl-2(5H)-pyrrolone was obtained as white needle crystals melting at 237° C. with decomposition beginning at 232° C.

*Analysis.*—Calculated for $C_{17}H_{14}N_2O_3$: N, 9.52%. Found: N, 9.31%.

EXAMPLE VII

A mixture of 19 parts of 1,2-cycloheptanedione, 12.8 parts (an equimolar proportion based on the dione) of cyanoacetamide and about 35 parts of absolute ethanol was made basic by the addition of about one part of an aqueous 10% sodium hydroxide solution. Reaction occurred almost instantly as evidenced by an increase in the temperature of the reaction mixture which was allowed to cool slowly over a period of one hour at room temperature and then finally cooled in an ice-water bath. The resultant solid was removed by filtration and after drying there was thus obtained 14.5 parts (49% of theory) of crude 3-cyano-5-hydroxy-4,5-pentamethylene-2(5H)-pyrrolone. After recrystallization from water, the purified product, which can more properly be identified as 2-cyano-3-keto-5-hydroxy-4-azabicyclo[3.5.0]-1-decene, was obtained as white needle crystals melting at 158–162° C. with decomposition beginning at 151° C.

*Analysis.*—Calculated for $C_{10}H_{12}N_2O_2$: C, 62.48%; H, 6.30%. Found: C, 62.61%, 62.64%; H, 6.35%, 6.35%.

EXAMPLE VIII

A solution of 12.6 parts of 1,2-cycloheptanedione and 10.2 parts (an equimolar proportion based on the dione) of malonamide in a mixture of 75 parts of water and about 50 parts of ethanol was brought to a pH of about 9.0 by the addition of one part of aqueous sodium hydroxide. The temperature of the reaction mixture rose rapidly from 28–35° C. and a white solid began to precipitate. The reaction mixture was allowed to stand at room temperature for four hours and finally cooled in an ice-water bath. The resultant solid precipitate was then removed by filtration and dried. There was thus obtained 16.5 parts (79% of theory) of crude 3-carbamyl-5-hydroxy-4,5-pentamethylene-2(5H)-pyrrolone. After recrystallization from water, the pure product which can more properly be termed 2-carbamyl-3-keto-5-hydroxy-4-azabicyclo[3.5.0]-1-decene, was obtained as white needle crystals melting at 211° C. with decomposition beginning at 187° C.

*Analysis.*—Calculated for $C_{10}H_{14}N_2O_3$: C, 57.14%; H, 6.71%; N, 13.33%. Found: C, 57.25%, 57.42%; H, 6.75%, 6.72%; N, 13.23%, 13.26%.

EXAMPLE IX

The pH of a mixture of 8.6 parts of diacetyl, 25 parts of water and 17.3 parts (an equimolar proportion based on the diacetyl) of N-carbamylmethylpyridinium chloride (also identifiable as the chloride of α-pyridinium acetamide) was adjusted to 8.0–9.0 by the addition of aqueous 10% sodium hydroxide. The temperature of the reaction mixture rose rapidly from 29° C. to 45° C. and slowly decreased while standing at room temperature for 24 hours. The reaction mixture was then neutralized with dilute hydrochloric acid and evaporated to dryness by heating at 100° C. under a pressure corresponding to 1 mm. of mercury. The hygroscopic solid residue thus obtained was taken up in excess absolute ethanol and the solid remaining removed by filtration. There was thus obtained 11 parts (42% of theory) of crude 3-pyridinium-5-hydroxy-4,5-dimethyl-2(5H)-pyrrolone chloride monohydrate. After recrystallization by dissolving in absolute methanol and precipitating with excess absolute diethyl ether, there was obtained the pure chloride of 3-pyridinium-5-hydroxy-4,5-dimethyl-2(5H)-pyrrolone as a white crystalline material exhibiting no melting point and beginning to decompose at 190° C.

*Analysis.*—Calculated for $C_{11}H_{15}N_2O_3Cl$: C, 51.07%; H, 5.85%; N, 10.85%; Cl, 13.69%. Found: C, 51.07%, 51.25%; H, 5.99%, 6.07%; N, 10.68%, 10.60%; Cl, 13.64%, 13.75%.

EXAMPLE X

Excess hydrogen sulfide gas was bubbled through a mixture of 15.2 parts of 3-cyano-5-hydroxy-4,5-dimethyl-2(5H)-pyrrolone (see Example III above), 2 parts of tri-ethanolamine and about 35 parts of absolute ethanol for 10 hours at 30° C. During the reaction the original colorless mixture slowly turned to deep yellow. The resultant yellow colored solid was removed by filtration and dried. There was thus obtained 13 parts (70% of theory) of crude 3-thiocarbamyl-5-hydroxy-4,5-dimethyl-2(5H)-pyrrolone. Upon recrystallization from nitromethane pure 3-thiocarbamyl-5-hydroxy-4,5-dimethyl-2(5H)-pyrrolone was obtained as bright yellow needles melting at 172–173° C. with decomposition beginning at 155° C.

*Analysis.*—Calculated for $C_7H_{10}N_2O_2S$: N, 15.05%; S, 17.22%. Found: N, 15.19%; S, 17.17%.

EXAMPLE XI

Part A

To 113 parts of ethyl cyanoacetate was added directly and in one portion 68.5 parts (1.2 molar proportions based on the cyanoacetate) of allylamine. The reaction mixture became quite warm and a solid slowly began to form. After being allowed to stand for three days at room temperature, the reaction mixture was cooled in an ice-water bath and the resultant solid product (85 parts) removed by filtration. Evaporation of the filtrate resulted in the isolation of an additional 15 parts of product. There was thus obtained a total of 100 parts (80% of theory) of crude N-allylcyanoacetamide. Upon recrystallization from diethyl ether the pure N-allylcyanoacetamide was obtained as white crystals melting at 64–65° C.

*Analysis.*—Calculated for $C_6H_8N_2O$: C, 58.05%; H, 6.50%. Found: C, 58.44%, 58.21%; H, 6.52%, 6.62%.

Part B

To a mixture of 12.4 parts of the above N-allylcyanoacetamide and 21.0 parts (an equimolar portion based on the amide) of benzil in about 40 parts of absolute ethanol was added about 0.5 part of an aqueous 10% sodium hydroxide solution, thereby bringing the pH of the mixture to about 8.0–9.0. The temperature of the reaction mixture rose spontaneously from 20° C. to 40° C. with formation of a clear solution from which, on slow cooling to room temperature, a solid began to form. After further cooling the mixture in an ice-water bath, the resultant solid was removed by filtration and dried. There was thus obtained an essentially quantitative yield of crude 3-cyano-5-hydroxyl-1-allyl-4,5-diphenyl-2(5H)-pyrrolone in the form of its monoethyl alcoholate. Upon recrystallization from absolute ethyl alcohol the pure ethyl alcoholate of 3-cyano-5-hydroxy-1-allyl-4,5-diphenyl-2(5H)-pyrrolone was obtained as white crystals melting at 93° C. with the liberation of ethyl alcohol, resolidifying on continued heating and finally melting again at 170° C.

*Analysis.*—Calculated for $C_{20}H_{16}N_2O_2 \cdot C_2H_5OH$: C, 72.90%; N, 6.12%. Found: C, 72.75%, 72.65%; H, 5.91%, 5.81%.

Upon heating at 100° C. under a pressure corresponding to 1 mm. of mercury a sample of the pure monoethanolate was essentially quantitatively converted to pure 3-cyano-5-hydroxy-1-allyl-4,5-diphenyl-2(5H) - pyrrolone as white crystals melting at 170° C.

*Analysis.*—Calculated for $C_{20}H_{16}N_2O_2$: C, 75.93%; H, 5.10%. Found: C, 76.13%, 75.88%; H, 5.04%, 5.16%.

EXAMPLE XII

The pH of a solution of 12.4 parts of N-allyl-cyanoacetamide (see Example XI, Part A) and 8.6 parts (an equimolar proportion based on the amide) of diacetyl in 50 parts of water was adjusted to about 8.0–9.0 by the addition of about 0.1 part of an aqueous 10% sodium hydroxide solution. The temperature of the solution rose spontaneously from 25° C. to 45° C. and slowly decreased to room temperature. During the cooling process a colorless oil separated. Upon separation of the oil fraction and drying at 80° C. under a pressure corresponding to 1 mm. of mercury there was obtained 13.0 parts (67.7% of theory) of crude 3 - cyano - 5 - hydroxy - 1 - allyl - 4,5-dimethyl-2(5H)-pyrrolone as a clear, transparent oil.

*Analysis.*—Calculated for $C_{10}H_{12}N_2O_2$: C, 62.50%; H, 6.30%; N, 14.58%. Found: C, 62.13%, 61.89%; H, 6.39%, 6.31%; N, 14.68%, 14.84%.

The present invention is generic to 5-hydroxy-2-keto-(5H)-dihydropyrroles, i. e., the 5-hydroxy-2(5H)- pyrrolones, carrying in the 3-position an amino-hydrogen-free, electron attractive, functional group and, in the 4- and 5-positions monovalent hydrocarbon radicals of no more than 10 carbons each. These electron attractive functional groups, well recognized in the art as a class of substituent radicals, see Price supra, are frequently also characterized as those groups which are strongly, i. e., greater than 50%, meta-directive in substitution reactions in the benzene ring. Suitable specific illustrations of these electron attractive groups include the carboxyl group and groups hydrolyzable thereto, the various quaternary onium and inium salt groups such as the quaternary phosphonium, sulfonium, and ammonium salt groups, and the like.

A particularly preferred class of these electron attractive functional substituents in the 3-position of the new 2-pyrrolones of the present invention are those electron attractive functional groups which are negative or acidic in character and carry a multiple atomic linkage therein, especially the carboxyl group and groups hydrolyzable thereto or to carboxylic acids. This preferred class of these 3-functional substituents includes specifically the carboxyl group, the cyano group, carboxamido, including both mono- and di-substituted carboxamido groups, carboxy ester groups, acyl groups of carboxylic acids, i. e., carbacyl groups, e. g., butyryl, and the like. Of the remaining positions in the ring structure of these 5-hydroxy-2-(5H)pyrrolones each of positions 4- and 5- carries a monovalent hydrocarbon radical of up to 10 carbons, which radicals may be joined together as in the product of Examples 7 and 8 to form a divalent organic radical. Position 1 carries hydrogen or a monovalent hydrocarbon radical of up to 10 carbons.

Thus, the new 3-functionally substituted 2(5H)-pyrrolones of the present dinvention are characterized by the following structural formula:

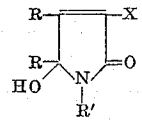

wherein, as illustrated specifically in the preceding examples and the following discussion, R' is hydrogen or a monovalent hydrocarbon radical of up to 10 carbons and the R's are monovalent hydrocarbon radicals of up to 10 carbons which may be joined together to form a carbocycle of generally from 5 to 7 ring carbons; and X represents the amino-hydrogen-free, monovalent electron attractive functional group which is preferably hydrolyzable to carboxyl or to a carboxylic acid, e. g., cyano, carboxyl, carboxy ester (—COOR), carbamyl, mono- and di-substituted carboxamido (—CONHR and —CONRR), and carbacyl (—COR), wherein the R's are as given above. Because of greater ease of preparation, the 4,5 symmetrically substituted products are preferred—hydrogen not being considered a substituent.

Specific examples of the new compounds of this invention, in addition to those already illustrated in the foregoing examples, include those 5-hydroxy-2(5H)-pyrrolones carrying an electron attractive amino-hydrogen-free functional substituent in position 3 wherein: the 3-substituent is a quaternary onium salt group such as 3-dimethylsulfonium - 5 - hydroxy - 4,5 - diisobutyl - 2(5H) - pyrrolone iodide, 3 - dimethyldodecylammonium - 5 - hydroxy - 4,5 - dimethyl - 2(5H - pyrrolone chloride, 3-quinolinium - 5 - hydroxy - 4,5 - diphenyl - 2(5H) - pyrrolone methylsulfate and the like; and the preferred compounds wherein the 3-substituent is carboxyl or a group hydrolyzable thereto or to a carboxylic acid, such as 3-cyano - 5 - hydroxy - 4,5 - tetramethylene - 2(5H) - pyrrolone or more properly 2-cyano-3-keto-5-hydroxy-4-azabicyclo[3.4.0] - 1 - nonene, 3 - propionyl - 5 - hydroxy-4,5 - diphenyl - 2(5H) - pyrrolone, 3 - cyano - 5 - hydroxy - 4,5 - dibenzyl - 2(5H) - pyrrolone, 3 - cyano - 5-hydroxy - 1 - cyclohexyl - 4,5 - dicyclohexylmethyl-2(5H) - pyrrolone, 3 - cyano - 5 - hydroxy - 1 - decyl-4,5-dimethyl-2(5H)-pyrrolone, and the like.

These new 3-functionally substituted 5-hydroxy-2(5H)-pyrrolones can be easily and conveniently prepared in high yields by direct condensation under aqueous basic conditions between vicinal diketones and primary or secondary acetamides, i. e., mono- or diamido-hydrogen-bearing acetamides, wherein the alpha carbon carries two hydrogens and directly singly bonded thereto a strong electron attractive functional group, i. e., a strongly meta-directing group, which is free of aminohydrogen. The two reactants, that is, the vicinal diketone, and the alpha-functionally substituted acetamide are preferably used in essentially equimolar active proportions, i. e., for each vicinal dioxo group there is used an equimolar proportion of the α-functionally substituted-α,α,N-trihydrogen-bearing-acetamide.

The condensation normally is carried out at temperatures in the ranges −25 to 150° C. or higher, preferably between 0 and 100° C., and for convenience most preferably in the range 10–70° C., and an aqueous alkaline medium. The condensation is base catalyzed, i. e., molar proportions of base are not necessary and in fact should be avoided in the case of the stronger bases since high proportionalities of these strong bases lead to scission of the pyrrolone rings. The degree of basicity usually will range between a pH of 7 and a pH of 9. This degree of basicity can be readily obtained by adding controlled amounts of the strong organic or inorganic bases or larger quantities of weaker bases.

The base used to furnish the required degree of alkalinity can be any one or more of the well recognized classes of inorganic and organic bases. Specific illustrations of the more common of the inorganic bases include, for instance, the alkali and alkaline earth metal oxides, hydroxides, e. g. potassium hydroxide, calcium oxide, and the like, as well as similar basic compounds of the other metals, although the latter are not preferred. Also included are the alkali metal salts of weak acids, e. g., the acetates, borates, carbonates, and bicarbonates, phenolates, phosphites, acid phosphites, and the like. As illustrative of the organic bases there can be mentioned the alkali metal and alkaline earth metal alcoholates, usually the alkoxides, e. g., lithium methylate and the like; the basic amines such as the tertiary aliphatic amines and quaternary ammonium hydroxides, e. g., triethylamine and the like.

The vicinal diketones used as one of the essential reactants in forming the new 5-hydroxy-2(5H)-pyrrolones of the present invention are simply those organic compounds containing at least one pair of carbonyl groups directly joined to each other per molecule and otherwise linked directly only to carbon. These vicinal diketones are conveniently described by the following structural formula:

RCOCOR wherein the R's are monovalent hydrocarbon radicals of up to 10 carbons alike or different, which are preferably free of aliphatic unsaturation, and can be aliphatic, aromatic, alkaromatic, araliphatic, or cycloaliphatic, in nature, and can also be together joined to form with the two carbonyl carbons a cyclic structure of as many as a total of 20 ring members but conventionally of five to seven ring units. It is to be noted that two R's appear as substituents on the 4 and 5 carbons in the final 5-hydroxy-2(5H)-pyrrolones and in those instances where the R's are joined together the final products will be bicyclic in structure with the fused ring stemming from the pyrrolone structure in the 4,5 position. Because of problems arising in separating the 4,5 position isomers, it is generally preferred to use vicinal diketones where both R groups are the same. Undesirable side reactions are frequently encountered under the necessary basic conditions, with vicinal dicarbonyl compounds having hydrogen on oxo carbon. The use of symmetrical vicinal diketones results in the most preferred products, the 4,5-symmetrically disubstituted-5-hydroxy-2(5H)-pyrrolones.

The present invention thus is generic to the use of vicinal diketones including, in addition to those of the examples: aliphatic diketones, e. g., 2,2,5,5-tetramethyl-3,4-hexanedione, and the like; aromatic diketones, alkaromatic diketones, e. g., 1,2,di-p-tolyl-1,2-ethanedione, i. e., tolil in trivial nomenclature, and the like; araliphatic diketones, e. g., 1,2-dibenzyl-1,2-ethanedione (i. e., 1,4-diphenyl-2,3-butanedione), and the like; cycloaliphatic and cycloaliphatic/aliphatic diketones, e. g., 1,4-dicyclohexyl-2,3-butanedione, 1,2-cyclopentanedione, 1,2-cyclohexanedione, and the like; mixed substituent α,β-dicarbonyl compounds, e. g., unsymmetrically substituted vicinal diones, e. g., 1-phenyl-1,2-butanedione, 1-phenyl-1,2-propanedione, and the like.

In addition to certain indicated trivial names, these compounds can also be named as derivatives of glyoxal and indeed this seems to be preferred to the ethanedione type name. However, for reasons of consistency and to emphasize further the similarity in structure and reactivity, these intermediates have all been named in the foregoing primarily as vicinal diones.

The class of reactants used in conjunction with the above referred to vicinal dicarbonyl compounds to form the new 5-hydroxy-2(5H)-pyrrolones of the present invention are α-functionally substituted di-α-hydrogen-bearing, amide-hydrogen-bearing acetamides. These compounds have the following structural formula:

XCH$_2$CONHR wherein R is hydrogen, or a monovalent hydrocarbon radical of no more than 10 carbons, and X is a negative group, i. e., a strong, electron attractive, amino-hydrogen-free group which, when attached to a benzene nucleus, exerts a positive electrostatic polarizing effect, on the adjacent carbon to carbon double bond of said benzene nucleus, at least $0.84 \times 10^{-4}$ dynes and is strongly (greater than 50%) meta-directing. Thus there can be employed, for reaction with the vicinal diketones, the compounds of the above formula wherein X is variously carbacyl, carbamyl, cyano, carboxyl, carboxyester, carboxamido (including both mono- and di-substituted carboxamido), or a quaternary ium, including onium and inium, salt group, e. g., substituted sulfonium, ammonium pyridinium, and the like, and is preferably carboxyl or groups hydrolyzable thereto or to carboxylic acids. Suitable specific illustrations, in addition to those given in the examples, include such quaternary onium and inium α,α-N-trihydrogen-bearing acetamides as dimethylsulfoniumacetamide iodide, trimethylammoniumacetamide methylsulfate, α-(1-quinolinium)-acetamide chloride, α-(1-pyridinium)-N-methylacetamide bromide, and the like; and the preferred α-electron attractive substituted α,α-N-trihydrogen-bearing acetamides wherein the said electron attractive group is hydrolyzable to carboxyl or a carboxylic acid, e. g., cyanoacetamide, octyl malonamate, malonamic acid, α-aceto-N-butylacetamide, N-isohexylmalonamide, N,N-dimethyl-N'-cyclohexylmalonamide, and the like.

The electron attractive substituent on the alpha carbon of the acetamides appears as the substituent in position 3 of the pyrrolone structure and the substituent, if any, on the acetamido nitrogen, i. e., R in the foregoing formula appears as the substituent on position 1 of the pyrrolone ring.

The new 3-functionally substituted 5-hydroxy-2(5H)-pyrrolones of the present invention are in general colorless and exhibit good water-solubility, particularly under mildly acidic or basic conditions. The compounds exhibit a characteristic ultraviolet absorption curve exhibiting a major absorption peak usually in the range of about 2100–2200 m. These 3-functionally substituted 5-hydroxy-2(5H)-pyrrolones exhibit luminescent response of varying degrees, depending on the wave lengths of the exciting light, and are thus useful as "phosphors" in the preparation of television and radar tubes and the like.

The preferred 5-hydroxy-2(5H)-pyrrolones carrying in the 3-position an electron attractive negative grouping carrying a polyatomic linkage therein which is hydrolyzable to carboxyl, as exemplified specifically in the foregoing examples, range from high boiling oils to crystalline solids of relatively high melting point depending on degree and character of ring substitution. Most of the compounds of this class fall in the latter category and exhibit interesting fluorescent properties. 3-cyano-5-hydroxy-4,5-diphenyl-2(5H)-pyrrolone of Example V, for instance, exhibits a blue fluorescence after excitation by ultraviolet light of short wave length and a strong blue-white luminescence after excitation by relatively long wave ultraviolet light. This compound is also further characterized in exhibiting a blue cathodoluminescence.

These new 3-functionally substituted 5-hydroxy-2(5H)-pyrrolones are useful as chemical intermediates, e. g., in catalytic hydrogenation to the otherwise difficultly accessible corresponding 3-functionally substituted 5-hydroxy-2-pyrrolidones. Certain of these new pyrrolones also exhibit interesting physiological activity, for instance, as pesticides or fungicides, or both.

The various class members of this new group of pyrrolones, as defined by the functional group in position 3, are interconvertible. Thus, the 3-cyano-5-hydroxy-2(5H)-pyrrolones of this invention can be converted to the corresponding 3-carboxylic acid, ester, or amide derivatives. Similarly, the 3-carboxylic acid derivatives can be converted to the corresponding carboxyester or carboxamide derivatives; the latter can be converted to the corresponding cyano derivatives, etc. Because of their greater versatility and handleability in such reactions the 3-cyano-5-hydroxy-2(5H)-pyrrolones are preferred.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A 5-hydroxy-2(5H)pyrrolone having on each of the 4- and 5-carbons a monovalent hydrocarbon radical of up to 10 carbon atoms each, which may be joined together, having on the ring nitrogen a member of the group consisting of hydrogen and monovalent hydrocarbon radicals of up to 10 carbon atoms; and having on the 3-carbon a substituent selected from the group consisting of quaternary onium and inium salts, carboxyl, and groups hydrolyzable thereto linked directly from the carbon of said group to said 3-carbon of the pyrrolone nucleus.

2. A 5-hydroxy-2(5H)pyrrolone having on each of the 4- and 5-carbons a monovalent hydrocarbon radical of up to 10 carbon atoms each, which may be joined together; having on the ring nitrogen a member of the group consisting of hydrogen and monovalent hydrocarbon radicals of up to 10 carbon atoms; and having a carboxyl radical on the 3-carbon.

3. A 5-hydroxy-2(5H)pyrrolone having on each of the 4- and 5-carbons a monovalent hydrocarbon radical of up to 10 carbon atoms each, which may be joined together, having on the ring nitrogen a member of the group consisting of hydrogen and monovalent hydrocarbon radicals of up to 10 carbon atoms; and having a cyano radical on the 3-carbon.

4. A 5-hydroxy-2(5H)pyrrolone having on each of the 4- and 5-carbons a monovalent hydrocarbon radical of up to 10 carbon atoms each, which may be joined together, having on the ring nitrogen a member of the group consisting of hydrogen and monovalent hydrocarbon radicals of up to 10 carbon atoms; and having a carbamyl radical on the 3-carbon.

5. 3 - cyano - 5 - hydroxy - 4,5 - dimethyl - 2(5H)-pyrrolone.

6. The process for preparing 5-hydroxy-2(5H)-pyrrolones having on the 3-carbon a strongly meta orienting monovalent group, wherein a vicinal diketone of the formula RCOCOR in which the Rs are monovalent hydrocarbon radicals of up to 10 carbon atoms each, which may be joined together, is reacted in a basic aqueous solution of pH not greater than 9 with an acetamide having on the acetamido nitrogen a member of the group consisting of hydrogen and monovalent hydrocarbon radicals of up to 10 carbon atoms and having on the alpha carbon two hydrogens and a substituent selected from the group consisting of quaternary onium and inium salts, carboxyl, and groups hydrolyzable thereto linked directly from the carbon of said group to the alpha carbon of the acetamide.

7. The process for preparing 5-hydroxy-2(5H)-pyrrolones having on the 3-carbon a strongly meta orienting monovalent group, wherein a vicinal diketone of the formula RCOCOR wherein the Rs are monovalent hydrocarbon radicals of up to 10 carbon atoms each, which may be joined together, is reacted in a basic aqueous solution of pH not greater than 9 with an acetamide having hydrogen on the acetamido nitrogen and having on the alpha carbon two hydrogens and a substituent selected from the group consisting of quaternary onium and inium salts, carboxyl, and groups hydrolyzable thereto, linked directly from the carbon of said group to the alpha carbon of the acetamide.

References Cited in the file of this patent

"An Outline of Organic Nitrogen Compounds," Degering, University Lithoprinters, Ypsilanti, Michigan (1945), page 649 only.

"Organic Chemistry," Whitmore, Van Nostrand Co., New York, 2nd edition, 1951, page 623 only.

Berichte, vol. 44, page 1763.